United States Patent Office 3,290,159
Patented Dec. 6, 1966

3,290,159
DEHYDRATED PRECOOKED BEAN PROCESS
William R. Dorsey, Orinda, and Sumner I. Strashun, El Cerrito, Calif., assignors to Vacu-Dry Company, Emeryville, Calif., a corporation of California
No Drawing. Filed Sept. 30, 1963, Ser. No. 312,319
2 Claims. (Cl. 99—204)

This invention relates generally to dehydration processes and more particularly to a process for dehydrating beans which minimizes undesirable "butterflying" of the bean cotyledons.

This invention relates generally to dehydration processes and more particularly to a process for precooking and dehydrating beans which provides a preselected degree of cook and minimizes undesirable "butterflying" of the beans.

One object of this invention is to provide a process for precooking beans which, when dehydrated, produce beans having skin and cotyledons in substantially their natural state but with a slight fissure to enhance the bean reconstitution rate.

Another object of this invention is to provide a precooked, dehydrated bean which rehydrates with a cooked taste and texture within specific rehydration times.

A further object of this invention is to provide a controlled air drying technique which minimizes undesirable bean "butterflying" normally occurring in the rapid dehydration of precooked beans.

One other object of this invention is to provide a bean treatment method for precooking and dehydrating beans which retains the natural texture balance between bean skin and cotyledons.

Other objects and advantages of this invention will become apparent to those skilled in this art upon consideration of the following description of selected embodiments of the invention.

Heretofore, various types of legumes, including beans, have been cooked and dehydrated, but problems have been encountered in "butterflying" of the beans during dehydration. As described by Feldberg, Fritzsche and Wagner in an article entitled "Preparation and Evaluation of Precooked Dehydrated Bean Products," appearing in Food Technology for November 1956, precooked beans normally split wide open immediately upon exposure to a dehydrating environment. This splitting, known as "butterflying," apparently is caused by a differential rate of drying between the bean skin and cotyledon. The skin dries more rapidly and contracts. The slower-drying cotyledon develops internal vapor pressures of such magnitude that the pressure ruptures the skin and produces the butterflying effect.

One method for reducing the butterflying is to freeze the beans prior to dehydration as described in the article entitled "New Continuous Production Facility for Processing 'Instant' Precooked Beans," appearing in Food Technology (1961), vol. XV, No. 9, pages 13–18. However, the blast freezing equipment there described is relatively expensive and requires plant area and facilities completely eliminated by the present invention.

In the present process butterflying is almost completely eliminated by reducing the initial bean drying rate of the precooked beans until the moisture content is below the 40% level by weight. The beans then are rapidly dried to their final low moisture content. The described process is useful for producing beans having a variable cooked condition so that they are useful as "simmer type" beans for use as an admixture with other dry ingredients in soups or casseroles which upon reconstitution are subsequently cooked slightly or simmered. The process also is useful in producing an "instant" type bean which upon rehydration instantly reconstitutes and can be eaten without further cooking.

The process is applicable both to dry legumes such as navy beans, red beans, lima beans, kidney beans, pinto beans, etc., and to freshly harvested beans such as fresh lima beans.

In one embodiment of the invention for "instant" type beans, fresh lima beans, after passing the customary inspection and pre-washing procedures, feed directly to an atmospheric steam blancher for approximately 15 minutes at 212° F. During residence in the blancher atmospheric steam thoroughly cooks the beans. For "simmer type" beans for use in soups, casseroles and other uses, the residence time is reduced to 10 minutes at atmospheric conditions in the steam blancher.

In the event one uses frozen lima beans as a feed stock, they feed directly to the blancher and normally need not be inspected or pre-washed. Exposure to the atmospheric steam initially thaws the frozen beans and then cooks them. For beans held at −10° F. the residence time in the blancher should be around 15 minutes for "simmer type" beans and 20 minutes for "instant type" beans.

During the described blanching step the beans are treated with a ¼% water solution of monosodium phosphate applied over the bean exterior. The gentle corrosive action of this alkali on the skin tenderizes the skin. It also preserves the chlorophyll in lima beans so that they retain their green color after dehydration. The tenderization of the skin results in a normal texture balance between skin and cotyledon after dehydration.

The beans then are quenched or cooled and dewatered as they pass from the cooking facility to dehydrating equipment. Enroute a sulphite spray contacts each bean. The sulphite concentration is adjusted to yield 200–800 p.p.m. sulfur dioxide in the final product.

Dehydration takes place next in conventional drying equipment such as the air dryer described in U.S. Patent No. 2,541,859, issued to R. W. Callaghan et al. on February 13, 1951. To eliminate "butterflying" of the beans, dehydration must be in two stages. A first stage of dehydration at a slow moisture removal rate in the order of one pound of moisture per pound of dry bean solids per hour reduces the bean moisture content from an initial value normally around 55% to 35–40%. This is followed by a second stage of more rapid dehydration down to the approximate final moisture content. By way of example, lima beans are exposed to a drying temperature of 130° F. for about 2 hours to reduce the moisture content to 35–40%. This is followed by subsequent rapid drying at 160° F. for about 1 hour to bring the final moisture down to 6–10% by weight on a dry basis.

The beans then may be finished dried in a finishing bin by exposure to a stream of dry air passing through the beans at about 130° F. This reduces the bean moisture to less than 10% in 4 to 6 hours.

The beans then are given a final inspection, treated with anti-oxidant, such as butylated hydroxy-anisole and packaged.

A similar process is useful for dehydrating "instant" or "simmer" type navy beans (for example California small white navy beans and Michigan pea beans), small red, or kidney beans. The principal difference in processing these beans as compared to fresh lima beans resides in the fact that fresh lima beans are a fresh vegetable with a high initial moisture content, whereas the navy or red beans are a dry vegetable normally having a moisture content around 10% by weight.

In processing navy, red beans, or kideny beans, field inspected and pre-washed and "destoned" beans feed into a continuous atmospheric steam blancher. The exposure time to atmospheric steam is a minimum of 15 minutes and preferably in the order of 20 to 25 minutes to insure inactivation of the lipoxidase enzyme. Inactivation of this enzyme is important to prevent subsequent deterioration in storage manifested by off-odors.

Since the beans were initially at about 10% moisture, they then are rehydrated in soaking tanks containing cold running water for at least 5 to 6 hours to bring the moisture content up to 50–55%.

The beans then are cooked, preferably in a pressure cooker. For "instant" type beans the cooking should be for approximately 10 minutes at 13 p.s.i.g. steam pressure 243° F.). For "simmer" type beans a shorter cooking period of 8 minutes is employed.

The beans then are quenched in cold water to remove surface heat. This generally reduces the overall bean temperature to about 85–100° F. It has been found that this rapid water quench aids in reducing butterflying in the beans which air cooling with fans is unable to do.

The beans are dewatered in a shaking screen, for example, enroute to the dehydrating equipment. Again a two stage dehydration including an initial stage of slow moisture removal followed by a rapid dehydration, eliminates undesirable bean butterflying. During the first stage of dehydration the beans are exposed within the dehydrator for approximately ½ hour to circulating air at room temperature. This is followed by a half hour of drying using 120° F. air and a final slow drying of 1 hour at 130° F. air temperature. This reduces the bean moisture to 35–40% or less. The air temperature then is increased to around 150–160° F. to bring the moisture rapidly down to around 6–10% by weight on a dry basis.

The subsequent processing of the navy or red beans is similar to the procedures described for lima beans. The beans are finish-dried in a finishing bin to less than 10% moisture by exposure to an air stream at about 125–130° F. for approximately 4 hours. They then are inspected, treated with an anti-oxidant, such as butylated hydroxy-anisole and subsequently packaged.

Employment of the two step dehydration described in the foregoing examples almost completely eliminates butterflying of both fresh type beans, such as lima beans, and of dry type navy or red beans. Nonetheless, the beans do fissure slightly to enhance the dehydration rate. The slow initial dehydration rate seems to eliminate explosive vapor pressures within the interior of the bean which heretofore caused them to explode open and butterfly.

The foregoing embodiments of the invention have been given for illustrative purposes only and no unnecessary limitations should be understood therefrom for various process modifications will be apparent to those familiar with this art. The invention is defined in the appended claims.

We claim:
1. In a process for dehydrating dry type beans wherein said beans are rehydrated to a moisture content of approximately 55%, then pre-cooked and dehydrated to a final moisture content within the range of 6–10%, the improvement comprising dehydrating said beans in two air drying stages including a first dehydration at a slow drying rate including exposure for a half-hour to drying air at about 70° F., followed by exposure for a half-hour at 120° F. drying air temperature, and then one hour at 130° F. drying air temperature; and a second stage at a higher dehydration rate by exposure to drying air at 150–160° F.

2. A process according to claim 1 wherein said dehydration is immediately preceded by a water quench to reduce the overall bean temperature to 85 to 100° F.

References Cited by the Examiner

UNITED STATES PATENTS

| Re. 4,468 | 7/1871 | Smith | 99—204 |
|---|---|---|---|
| 2,402,673 | 6/1946 | Schaffner | 99—204 |
| 2,657,999 | 11/1953 | Rauch | 99—98 |
| 3,108,884 | 10/1963 | Nielsen | 99—204 |

OTHER REFERENCES

U.S. Dept. of Agriculture, Commercial Dehydration No. 524, 1943, p. 22.

Feldberg, C., et al.: Food Technology, November 1956, pp. 523–525.

A. LOUIS MONACELL, *Primary Examiner.*

B. H. STRIZAK, S. J. BAICKER, J. M. GOLIAN,
*Assistant Examiners.*